United States Patent [19]
Gothrup

[11] 3,924,787
[45] Dec. 9, 1975

[54] CARRIER BRACKET FOR ATTACHING A BICYCLE RELATIVE TO A MOTOR VEHICLE'S BUMPER

[76] Inventor: James Pershing Gothrup, 3809 14th Ave., Oakland, Calif. 94602

[22] Filed: Jan. 7, 1974

[21] Appl. No.: 431,206

[52] U.S. Cl. .............................. 224/42.03 B; 211/17
[51] Int. Cl.² ............................................ B60R 9/10
[58] Field of Search... 224/42.03 B, 42.03 A, 42.03 R, 224/42.06, 42.45 R, 42.45 A, 42.46 R, 29 R; 211/17, 18, 19, 20, 21, 22

[56] References Cited
UNITED STATES PATENTS

| | | | |
|---|---|---|---|
| 2,157,001 | 5/1939 | Morley | 224/42.45 A X |
| 2,409,395 | 10/1946 | Schwinn | 224/42.03 B |
| 3,015,423 | 1/1962 | Garraway | 224/42.03 A |
| 3,735,981 | 5/1973 | Mallin | 211/22 |

*Primary Examiner*—Robert J. Spar
*Assistant Examiner*—Jerold M. Forsberg
*Attorney, Agent, or Firm*—Harold D. Messner

[57] ABSTRACT

The present invention relates to carrier bracket for disconnectedly connecting a bicycle in a substantial upright vertical position relative to the vehicle's bumper, the bracket also having the capability of being storable, in toto, in a position on the bicycle such that it does not inhibit normal cycling operation of the latter.

9 Claims, 5 Drawing Figures

U.S. Patent    Dec. 9, 1975    3,924,787
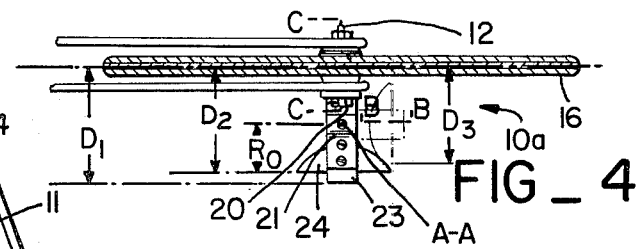
FIG_1
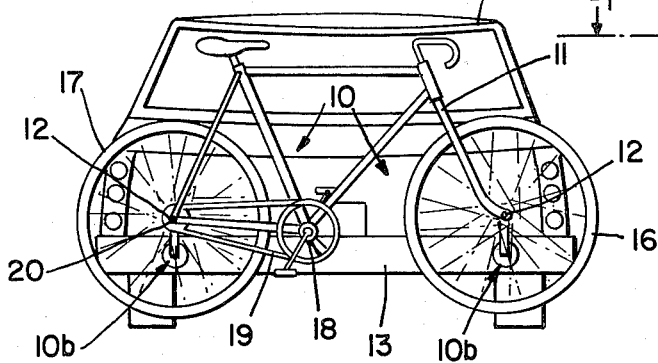
FIG_4
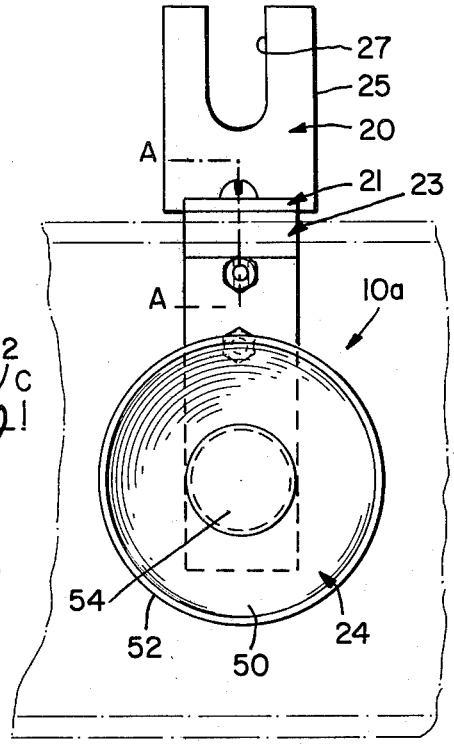
FIG_3
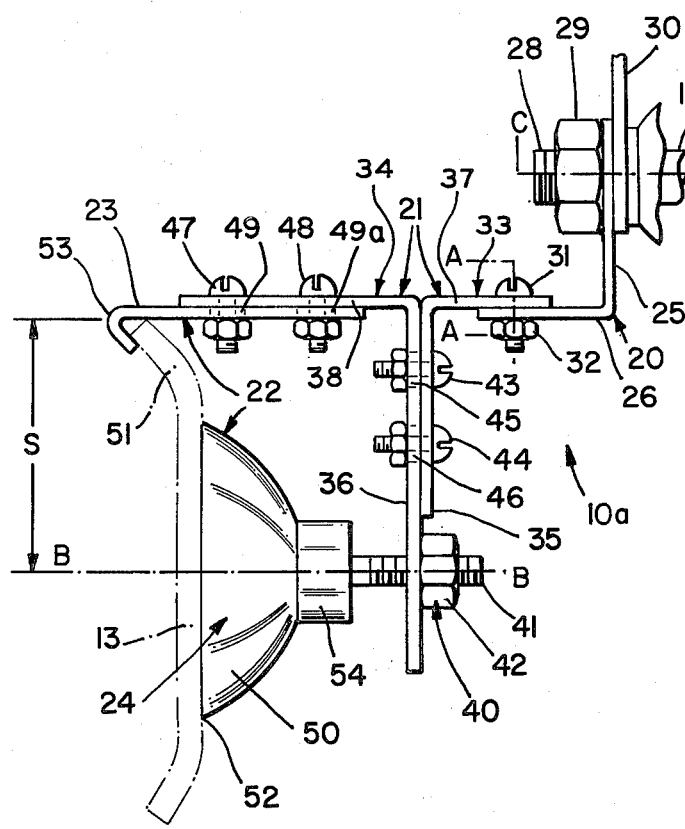
FIG_2
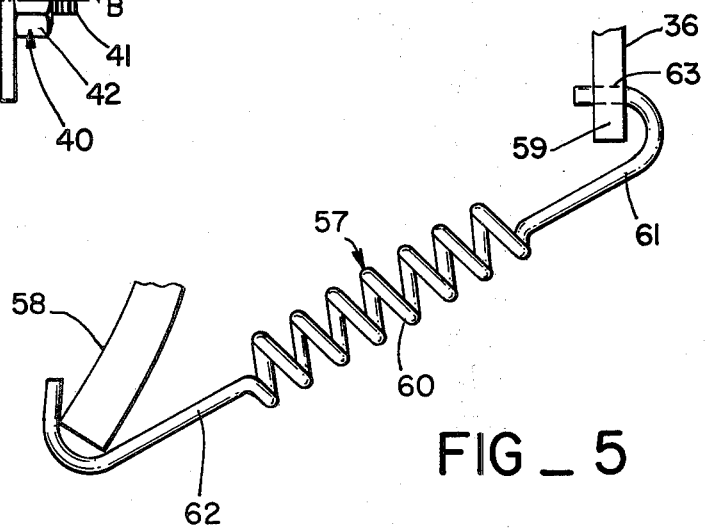
FIG_5

CARRIER BRACKET FOR ATTACHING A BICYCLE RELATIVE TO A MOTOR VEHICLE'S BUMPER

FIELD OF THE INVENTION

The present invention relates to a carrier bracket for attaching, in an improved manner, a bicycle relative to a bumper of a motor vehicle such as an automobile, truck, van or the like. More particularly, it relates to an improved carrier bracket for use in the aforementioned manner having the additional capability of being carryable—in toto— aboard the bicycle in a suitable storage position such storage of the carrier bracket not, in an unwieldy manner, interfering with the normal cycling operations of the bicycle and cyclist.

In this application, the terms "normal operating mode," "normal cycling mode" and "normal cycling operation" denote the cycling functions of the bicycle in which the cyclist imparts rotary motion in his legs through a crank to the rear wheel of the frame to cause rectilinear motion of the bicycle and cyclist over the surface of the earth.

Similarly, the terms "attaching mode" and "gripping operations" denote the occurrence in time when the bicycle is attached relative to a vehicle's bumper and thus transportable in conjunction therewith.

BACKGROUND OF THE INVENTION

While the prior art is replete with carrier brackets for connecting a bicycle relative to the bumper of a motor vehicle, none of which I am aware have attached the bracket to be easily stored—in toto—aboard the bicycle in a position such as not to interfere with normal cycling operations of the bicycle.

E.g., in U.S. Pat. No. 2,409,395 for "Bicycle Carrier," F. W. Schwinn, there shows a stud and socket unit that can be used for bumper-bicycle attachment; although the stud is permanently attached to the frame of the bicycle, the socket remains mounted to the vehicle's bumper when the bicycle is decoupled from the hanger.

Similarly, in U.S. Pat. No. 2,415,286, the crank handle is seen to be grasped between a pair of curved and bifurcated elements having a stud that attached through an opening in a support arm of an ordinary trailer hitch that, again, remains attached to the bumper when the bicycle is decoupled.

Finally, in U.S. Pat. No. 2,431,400 three separated semi-permanent brackets are used: one attached to the crank arms. The other two attaching to support the wheels of the bicycle.

BACKGROUND OF THE PROBLEM

A trend in cycling is toward full utilization of the bicycle for long distance excursions. Trips having a one-way distance of hundreds of miles, are not uncommon. During such excursions, problems can occur. E.g. circumstances such as terrain difficulties, equipment failure, foul climatic conditions, cyclist fatigue, can force abandonment of the trip. Then the cyclist is forced to seek alternate transportation for himself and his bicycle.

If the cyclist could easily and quickly attach his bicycle to any type of vehicle bumper, more likely than not, he could "hitch hike" to a new destination.

OBJECT OF THE INVENTION

An object of the present invention is the provision of a novel carrier bracket means for disconnectedly attaching a bicycle relative to the bumper of a motor vehicle wherein such carrier bracket means has the capability of being storable—in toto—in a permanent relationship relative to the frame of the bicycle but such storing position not interfering with the normal cycling operation of the bicycle.

SUMMARY OF THE INVENTION

In accordance with the present invention, a novel carrier bracket means has been provided for the aforementioned purposes, and includes a pair of surmounting support means each attached to but laterally offset from a wheel axle of the bicycle and carrying thereon an offset linking means capable of independent rotation with respect to the surmounting support means. In turn, the offset linking terminates in cooperative bumper engaging means which includes a suction cup attaching means spaced from a coextensive guide bar means. In operation, the cooperative bumper engaging means in responsive to components of forces generated during the bumper attaching mode to activate attachment forces between the bicycle and the bumper. Result: adequate attachment between the bumper and the aforementioned bumper engaging means without hindering normal cycling operations.

In accordance with another aspect of the present invention, the attaching and storage positions of the bumper clamping means are orthogonally spaced from each other over an arcuate sector in their plane of rotation, but the clamping means itself remains permanently linked to the bicycle frame even during roations of the offset linking means from one to the other position. Of course, the resulting offset profile varys (as viewed from a cyclist's seated position atop the bicycle) vary from a profile which has a maximum offset distance $D_1$ ("greatest offset reach") in the attachment mode, to a profile which has a much less severe offset distance $D_3$ in the storage position. Of course $D_1$ is always greater than $D_3$.

Controlled swingable rotation of the offset linking means relative to the axle surmounting means is easily achieved using human-engendered rotational forces, after attaching means therebetween are decoupled.

In yet another aspect, the bumper engaging means can be optionally modified to include a separate force-generating spring means coextensive with, but spaced from the aforementioned suction cup means and the guide bar means. The spring means is connected—in the attaching mode—to a lower edge of the bumper to aid in generating the required attachment forces for the cooperative bumper engaging means relative to the bumper.

In still yet another aspect, variations in widths, thickness and absolute altitudes of bumpers, are accomodated in the attaching mode, by forming the aforementioned offset linking means of a pair of L-shaped members having vertical legs in back-to-back surface contact. These vertical legs are held in surface contact by suitable attaching means, but can be adjusted—in elevation—to change the relative positions of their termination arms. Since these arms attach to the guide bar means and the surmounting means, respectively, it can be seen that such adjustments can easily allow for the secure attachment of many different size bicycles to correspondingly large numbers of vehicular bumpers. Similarly, the suction cup and guide bar means comprising the bumper engaging means, can also be adjustably mounted with respect to the L-shaped members. In that way, by initiating proper changes in their vertical spacing in the attaching mode, the carrier bicycle bracket of the present invention can be mounted to a plurality of vehicular bumpers irrespective of the widths or thicknesses of the latter.

In still yet another aspect of the present invention, each surmounting means is formed of a L-shaped orientation having a leg provided with an opening which fits over the wheel axle in fixed attachment between the frame fork and the wheel nut of the bicycle. The remaining leg extends away from the axle in the offset direction so as to not interfere with normal rotation of the wheel. It also forms a platform to which the offset linking means is pivotally attached so as to provide change in offset profile of the bumper engaging means when it is either in an attaching mode or in a storage mode.

FURTHER OBJECTS OF THE INVENTION

Further objects of the invention will become apparent from a detailed description of a single embodiment thereof which is given by way of example and not by way of limitation, reference being made to the accompanying drawings, in which

DESCRIPTION OF THE DRAWINGS

FIG. 1 is rear elevational view of a wheeled vehicle having a bicycle mounted thereon by a pair of carrier brackets of the present invention;

FIG. 2 is side elevation of one of the bicycle carrier bracket of FIG. 1;

FIG. 3 is rear elevational view of the carrier bracket of FIG. 2;

FIG. 4 is a top view of the carrier bracket of FIG. 2;

FIG. 5 is a detail of optional means which can aid in the attachment of carrier bracket of the present invention to the bumper of the vehicle of FIG. 1.

DETAILED DESCRIPTION OF AN SPECIFIC EMBODIMENT OF THE INVENTION

Reference should now be had to FIG. 1 illustrating carrier bracket means 10 of the present invention. Briefly, the functions of carrier bracket means 10 can include the following: to adjustably support a bicycle 11 relative to a bumper 13 of a motor vehicle 14 as well as to have the capability of being storable in positions adjacent to wheel axles 12 of the bicycle 11 such as not to hinder normal operations of the bicycle 11 as explained below. In order to operate in the aforementioned functional modes the carrier bracket means 10 of the present invention need not be provided with any of special mounting gear. That is to say, the bicycle 11 can be the end-product of manufacturing practices ordinarily found within the bicycle industry; the bicycle itself does not require the fabrications of special fasteners, e.g. locks, links, etc., in order to secure the carrier bracket means 10 relative thereto.

Now in more detail, the carrier bracket means 10 of present invention comprises two subassemblies 10a and 10b attached in permanent relationship with respect to axles 12 of front and rear wheel 16 and 17 of the bicycle 11 during the two operation modes of the latter: (i) during attachment of the bicycle 11 to the bumper 13 (see FIG. 1) as well as (ii) during detachment of the bicycle from the bumper 13 during normal operations of the bicycle 11, i.e. wherein the cyclist imparts (via his legs) rotary movement of crank 18, endless chain 19, sprocket 20 and rear wheel 17 to cause rectilinear movement of the bicycle 11 over the earth's surface. Furthermore, note also that the subassemblies 10a and 10b are identical. Hence only one such subassembly—e.g., subassembly 10a—need be described in detail as has been done below with special reference to FIG. 2, 3, and 4.

As shown in FIG. 2, the subassembly 10a is seen to be attached between front wheel axle 12 and bumper 13. It includes the following elements: (i) a L-shaped surmounting means 20 attached to the wheel axle 12, (ii) an offset linking mean 21 attached to but capable of pivotal rotation with respect to the surmounting means 20, say about vertical axis A—A, and (iii) a bumper engaging means generally indicated at 22 comprising an upper guide bar means 23 and a suction cup attaching means 24, carried on the terminus of the offset linking means 21 in contact with bumper 13. These elements will now be discussed in detail.

Surmounting Means 20

Still referring to FIG. 2, the surmounting means includes two arms: vertical arm 25 and horizontal arm 26. The vertical arm 25 has a slotted opening 27 (see FIG. 3) near its extremity through which shank 28 of the wheel axle 12 of FIG. 2 extends. Attachment is straightforward: Rotation of wheel nut 29 secures the arm 25 and fork 30 in surface, nonyielding, contact.

The horizontal arm 26 is provided with an opening (not shown) through which carriage bolt 31 coincident with axis A—A extends for threadable engagement to nut 32. Purpose: attachment of the horizontal arm 26 relative to the offset linking means 21, so as to permit the latter to undergo rotation with axis A—A as explained below.

Offset Linking Means 21

As shown in FIG. 2, offset linking means 21 is releasably attached to the surmounting means 20 by means of the aforementioned carriage bolt-nut unit 31 and 32 at the extremity of arm 26. It includes a pair of L-shaped members 34 and 32. Over a central region, these members are seen to include vertical legs 35 and 36 in back-to-back contact. At opposite extremities, horizontal legs 37 and 38 extending in horizontal directions for broad surface contact with the aforementioned arm 26 of the surmounting means 20, as well as to guide bar means 23 of the bumper engaging means 22, respectively.

Members 32 and 34 are also provided with additional attaching means of same interest in accomodating various sized bicycles and vehicular bumpers: (i) at least one of the vertical legs 35 or 36 at the lower extremity thereof is provided with a nut-and-bolt attaching means generally indicated at 40 for its attachment to suction cup attaching means 24 of bumper engaging means 22, such attachment occurring by threading stud 41 to attached bolt 42; (ii) over a central region of vertical legs 35 and 36 are seen to be provided additional nut-and-bolt attaching means 43 and 44 attaching through slot-opening channels at 45 and 46 for varying the elevations of the horizontal arms 37 and 38 with respect to a common datum plane and (iii) over horizontal arm 38 there is provided nut-and-bolt attaching means 47 and 48 for its connecting (through slot-openings in channels 49 and 49a) to bar means 23 of the bumper engaging means 22. In that way not only may spacing S between the horizontal axis of symmetry of the guid bar means 23 and central suction cup attaching means 24 be varied, but also having in offset distances $D_1$ and $D_2$ of these parts with respect to a plane (See FIG. 4) of reference through the bicycle wheels, they can likewise be adjusted to fit different sized bumpers and/or bicycles, as explained below.

It should be apparent from FIG. 4 that since the offset linking means 21 is pivotal about axis A—A with respect to the stationary mounting means 20, rotation of the former can carry the position of guide bar means 23 and suction cup attaching means 24 between orthogonal positions as depicted in FIG. 4. Purpose: to reduce the maximum offset distance $D_1$ of the attaching mode i.e. from a value equal $D_1$ occurring during attachment of the bicycle to the bumper (FIG. 2) to a less severe value equal to $D_3$ as when the bicycle is in use in its normal operational mode. In this regard note that frustoconical suction cup 50 of the suction cup suction means 24 (FIGS. 2 and 3) defines an axis of symmetry B—B which clearly depicts these positions: (i) in the attaching mode of FIGS. 2 and 3, the axis B—B is parallel to the axis of rotation C—C of the wheel axle (ii) in the storage mode, pictured in phantom line in FIG. 4, the axis B—B is seen to be normal to the aforementioned axis C—C.

It should also be apparent that if the radius $R_o$ of cup 50 as its attachment to bumper 13 in FIG. 2 i.e. at lip 52 is small compared to its total offset distance $D_2$, then in the storage mode of FIG. 4, the offset profile of the guide bar means 23 and/or suction cup attaching means 24 will define a sleek streamlined silhouette. However, where the diameter of the 50 at lip 52 is (equal to twice the radius of $R_o$) in the attaching mode (FIG. 4) is about equal to its total offset distance $D_2$ then the incremental reduction in offset spacing is minimal. I.e., in FIG. 4, $D_2-D_3=0$. In such circumstances, it would be expected that the cyclist would not bother to seek rotation of the offset linking means relative to surmounting means 20 when he operates his bicycle in the normal cycling mode. Instead he could carry out normal biking activities with the bumper engaging means 22 oriented as shown in FIG. 2.

Bumper Engaging Means 22

As previously mentioned, guide bar means 23 is vertically spaced in elevation from the suction cup attaching means 24 for attachment to bumper 13, see FIG. 2. In that way, through manipulation of attaching means 43 and 44, the former can engage upper curve edge 51 of the bumper 13 with its oppositely curved lip 53, while the latter engages the central region of the bumper 13 irrespective of the bumper elevation above the earth's surface. Similarly, in the offset direction of its lip 53 and suction cup attaching means 24 can be varied via adjustment in the attaching tension of various attachment means securing them with respect to offset linking means 21 to accomodate different bumper sizes. E.g. with regard to guide bar means 23, the attaching means 47 and 48 can be decoupled, to allow linear dislocation of the former in the offset direction away from surmounting means 20. Likewise, manipulation of attaching means 40 at the lower extremity of offset linking means 21 allows for offset dislocation of suction cup attaching means 24 relative to vertical leg 36 of L-shaped member 34.

In the attaching mode depicted in FIGS. 1 and 2, it is apparent that guide bar means 23 is subjected to tensile forces since the weight of the bicycle acts through its center of gravity which is offset from the bumper 13. Thus, the guide bar means 23 is composed of a material whose tensile strength is somewhat elevated to withstand the forces acting between its curved lip 53 and attachment means 47 and 48.

With regard to suction cup attaching means 24, similar tensile forces act thereon, due to the weight of the bicycle. However such forces are uniquely resisted owing to suction forces created at lip 52 of the attachment of the suction cup 50 with the bumper 13.

Generating suction pressure at the lip 52 of the suction cup 50 is straightforward. After the bicycle and carrier bracket 10 have been elevated so the guide bar means 23 connects to the upper edge 51 of the bumper 13, the suction cup attaching means 24 is rotated so that contact between the central region of the bumper occurs. I.e. lip 52 of the suction cup 50 contacts the bumper 13. At that moment, a known volume of air is trapped in the cavity formed by these parts. compressive pressure is then generated through the stud 4 of the attaching means 40 onto bonnet 54 at the apex of the interior frustoconical surface of the cup 50 due in part to the weight of the bicycle. (Human engendered force can also aid, if desired.) Incremental movement of the bonnet 54 toward the lip 52 occurs expelling incremental amounts of air. Retrogressive movement of the bonnet 54 then occurs in a direction away from the lip 52 due to the pliant nature of the material compressing the cup 50, e.g. rubber. Result: creation of large attachment forces at the intersection of lip 52 of the cup 50, and the bumper 13 without marring the exterior surface of the latter.

Operational Sequence

Assume that carrier bracket 10 of FIG. 1 has been permanently mounted—in toto—to the axles 12 to the bicycle 11 but also that the bicycle 11 has not been attached to the bumper 13. Assume also that the bumper clamping means 22 has been oriented to provide mamimum offset reach relative to rotational axis A—A, such maximum offset reach orientation being as seen in FIG. 2. Assume also that the upper guide bar means 23 and suction cup attaching means 24 have been correctly adjusted as to offset "reach" and elevational spacing to fit the bumper 13.

To attach the carrier bracket carrier 10 (and associated bike) relative to the bumper 13, the cyclist lifts the former until the guide bar means 23 is higher than the upper lip 51 of the bumper 13. By tilting the bike-bracket combination off vertical, the curved lip 53 of the guide bar means 23 can be made to engage the oppositely oriented lip 51 of the bumper 13 with out concurrent impact of suction cup attaching means 24 with the bumper 13. Then the bicyclebracket unit is rotated about the engagement axis of the lip 53 with lip 51 until the suction cup 50 of the suction cup attaching means 24 engages the central region of the bumper. Note at that moment that the weight of the bicycle bracket combination acting at its center of gravity in a reference plane offset from one guide bar means 23 and the suction cup attaching means 24. As a result of the weight of the parts, large compressional forces are brought to bear upon the bonnet 54 via stud 41 when the cup 50 contacts the bumper 13. As previously explained, subsequent incremental change in area within the aforementioned cavity creates large suction forces at the intersection of the lip 52 of the suction cup 50 and the bumper 13.

To release the suction pressure at the cup 50, the cyclist counter-rotates (counterclockwise in FIG. 2) the bicycle-bracket unit. Ultimately, the guide bar means 23 is also released from contact with the upper edge 51 of the bumper 13. And the bicycle-bracket unit can be dropped to the earth's surface. Preparatory to the cyclist mounting the bicycle 11, he should reposition the bumper engaging means 22 and suction cup means 24 into a sleek streamlined silhouette through rotation of the offset linking means 21 relative to axis A—A of the stationary surmounting means 20, in the manner previously explained with reference to FIG. 4.

It should be recalled that before swingable rotation of the offset means 21 about axis A—A can occur, the nut 32 must be loosened with respect to carriage bolt 31. Thus in some cases where the cyclist does not wish to carry hand tools, he may substitute a finger-controlled wing nut for the nut 32. After rotation has occurred and nut 32 retightened with respect to carriage bolt 31, it can be seen from FIG. 4 that the resulting offset distance, $D_3$ of the carrier bracket means 10, is less than that occurring in the attaching mode, i.e. distance $D_1$. Furthermore, note that since the guide bar means 23 and suction cup attaching means 24 undergo approximately 90° of rotation, the attaching and storable positions of the parts are said to be orthogonal to each other. Further the pivot axis A—A of the offset linking means 21 is seen in FIG. 2 to be transverse to the axis of rotation of the wheel axles 12 of the bicycle; however, this is not a firm requirement since attachment of the bumper engaging means 22 to the bumper 13 can occur in different offset and vertical orientations when different bumper sizes are taken into account, as previously explained.

Also when the bumper engaging means 22 is placed in the storable position as shown in phantom line in FIG. 2, it is apparent that offset distance $D_3$ is directly dependent upon the diameter of the lip 52 of the suction cup attaching means 24. (I.e. $2R_o$) However, such diameter must not be so large as to interfere with rotation of the bicycle wheels, but not so small as not to provide adequate gripping pressure in the attaching mode of the bracket. In this regard, a lip diameter of about 4 inches has been found to be adequate.

Modifications

FIG. 5 illustrates optional means for providing additional gripping force at the engaging surfaces in the attaching mode of the carrier bracket of the present invention relative to the vehicular bumper 13. In the attaching mode, it will be recalled that the weight of the bicycle acts in a reference plane throught the wheels offset from attachment of the carrier bracket relative to the bumper 13. Where vibration is a problem, it may be desirable to attach a third bumper engaging means such as force-engendering spring attaching means 57 between lower edge 58 of the bumper 13 and terminus 59 of leg 36 of the offset linking means 21 in the manner depicted in FIG. 5.

As shown, spring attaching means 57 includes a series of turns 60 terminating in ends 61 and 62. End 61 attaches to the terminus 59 of the leg 36 as through its fit within opening 63 therethrough. End 62 attaches about the lower edge 58 of the bumper 13.

When the carrier bracket is stored in the manner depicted in FIG. 4, optional spring attaching means 57 can assume two alternate positions: (1) it can be completely detached from the terminus 59 and carried in the cyclist's shirt pocket, or (2) it can be left in attachment with the terminus 59. To reduce likelihood of dragging along the ground, the cyclist can attach the "free" end 62 to the stud 41 of the attaching means 40 if he desires.

The carrier bracket means 10 of the present invention has been constructed and successfully tested for the purpose described in detail hereinbefore, such bracket having the following dimensions and attributes, one of which being the reduction in offset and elevational spacing dimensions while not interfering with normal cycling operations of the bicycle:

Surmounting Means 20
Arm 25, Length 3 inches
Arm 26, Length 2 inches
Offset Mounting Means 21
L-shaped Member 33
Horizontal Leg 37, Length 1½ inches
Vertical Leg 35, Length 5 inches L-shaped Member 34
Horizontal Leg 38, Length 2½ inches
Vertical Leg 36, Length 5 inches Although certain embodiments of the present invention have been illustrated and described, the invention is not meant to be limited thereby, but rather by the scope of the following claims in which I claim:

1. Carrier bracket means for connecting a wheeled bicycle relative to a motor vehicle's bumper but carryable—in toto—in permanent relationship relative to said bicycle in a manner which does not unduly hinder normal cycling operations, comprising:
   i. surmounting means fixedly attached to and offset from a wheel axle of said bicycle extending away from a central plane of reference through said wheel,
   ii. offset linking means disconnectably attached to said surmounting means at a predetermined offset position remote with respect to said central plane of reference, said offset linking means having adjustable cooperative bumper engaging means thereon, said linking means and said bumper engaging means being capable of pivotal movement with respect to said surmounting means to a stowed position so as to not interfere and hinder normal cycling operations,
   iii. said cooperative bumper engaging means including a suction cup attaching means and an upper bumper edge engaging bar means attached to said offset linking means at other selected offset locations more remote with respect to said central plane of reference,
   iv. said cooperative bumper engaging means being operative in response to components of force occurring during attachment of said cooperative bumper engaging means relative to said vehicle's bumper, to quickly affix said bicycle relative to said bumper,
   v. offset lengths for and elevational spacing above a datum of said offset linking means and said cooperative bumper engaging means being sufficiently small so as not to interfere with said normal cycling operations of said bicycle.

2. Carrier bracket means of claim 1 in which said suction cup attaching means includes a frustoconically shaped suction cup of pliant material attached by attaching means to said offset linking means in a position that places said cup in non-marring surface contact with a central region of said bumper during attachment of said bumper engaging means relative to said bumper, said cup also being recipient of compressional forces of sufficient amplitude when placed in contact with said bumper to generate suction pressure forces at a intersection surface thereof, said suction pressure forces being able to withstand subsequent tensile loads placed thereon due to the weight of said bicycle occurring during attachment of said carrier bracket means and said bicycle relative to said bumper.

3. Carrier bracket means of claim 1 in which attachment of said offset linking means relative to said surmounting means is provided by separate attaching means which provides releasable attachment therebetween, said releasable attaching means allowing detachment of said offset linking means relative to said surmounting means so as to permit pivotal movement of offset linking means and said cooperative bumper engaging means about an axis through said releasable attaching means to alter relative maximum offset distances of said carrier bracket means relative to said central plane of reference.

4. Carrier bracket means of claim 3 in which said altered relative offset distances varies from a maximum which defines an attaching position for said bumper engaging means to a minimum which defines a storage position for said offset linking means and said bumper engaging means relative to said central plane of reference of said bicycle.

5. Carrier bracket means of claim 4 in which attaching and storage positions are substantially orthogonal to each other.

6. Carrier bracket means of claim 1 in which said bumper edge engaging bar means is attached to said offset linking means and is coextensive with said suction cup attaching means, said bar means also including a curved lip for engaging about an upper edge of said bumper during attachment of said bumper engaging means relative to said bumper.

7. In releasibly mounting a two-wheeled bicycle relative to a bumper of a motor vehicle using a pair of carrier bracket means disconnectably mounted between said bicycle and said bumper, the improvement which allows each of said bracket means to be carryable—in toto—on said bicycle during normal cycling operations, comprising i. surmounting means attached to and laterally extending from each of said wheel axles of said bicycle,
  ii. offset linking means disconnectably attached to a remote end of said surmounting means said offset linking means having adjustable cooperative bumper engaging means thereon, said linking means and cooperative bumper engaging means being capable of pivotal movement with respect to said surmounting means to a stowed position so as to not interfere with normal cycling operations.
  iii. said cooperative bumper engaging means including suction cup attaching means and bumper upper edge engaging means capable of operative response to components of force in a bumper attaching mode to provide non-slip attachment of said bumper engaging means relative to said vehicle's bumper,
  iv. offset distances for and elevational spacing above datum of said bumper engaging means and said offset linking means, being sufficiently small so as not to interfere with normal cycling operation of said bicycle.

8. Improvement of claim 7 in which said bumper edge engaging means is coextensive with but spaced from said suction cup attaching means, and includes a curved lip which engages an oppositely curved upper edge of said bumper during said attachment mode means, said lip and edge being placed in gripping contact due to forces acting on said bumper edge engaging means generated in large part by the weight of said bicycle.

9. Improvement of claim 8 further comprising a compressive-force generating spring means coextensive with but spaced from said suction cup means and said bumper edge engaging means; said spring means being connected at one end to a lower edge of said bumper and at the other end to the offset linking means during said attaching mode to aid in generating required attachment forces for attaching said bumper engaging means relative to said bumper.

* * * * *